United States Patent
Moore et al.

(10) Patent No.: US 6,830,113 B2
(45) Date of Patent: Dec. 14, 2004

(54) DUST SUPPRESSION GUARD

(75) Inventors: Carl Moore, Macedonia, OH (US);
Sam Mazzo, Macedonia, OH (US);
Walter Barnette, Macedonia, OH (US)

(73) Assignee: Ohio State Home Services, Macedonia, OH (US)

( * ) Notice: Subject to any disclaimer, the term of this patent is extended or adjusted under 35 U.S.C. 154(b) by 0 days.

(21) Appl. No.: 10/197,079

(22) Filed: Jul. 17, 2002

(65) Prior Publication Data

US 2004/0011543 A1 Jan. 22, 2004

(51) Int. Cl.[7] ............................................. B25D 17/18
(52) U.S. Cl. ............................ 173/198; 173/71; 173/73; 173/171; 408/58; 408/67
(58) Field of Search ..................... 173/171, DIG. 2, 173/198, 71, 73; 408/56, 58, 67; 15/300.1, 325, 340.1, 345, 346

(56) References Cited

U.S. PATENT DOCUMENTS

| | | | | |
|---|---|---|---|---|
| 3,232,359 A | * | 2/1966 | Baglow | 173/198 |
| 4,051,880 A | * | 10/1977 | Hestily | 144/252.1 |
| 4,190,116 A | * | 2/1980 | O'Neal et al. | 173/38 |
| 4,271,916 A | * | 6/1981 | Williams | 175/215 |
| 4,294,317 A | * | 10/1981 | Amoroso | 173/198 |
| 4,955,984 A | | 9/1990 | Cuevas | |
| 4,986,371 A | | 1/1991 | Lowe | |
| 5,034,041 A | | 7/1991 | Austin | |
| 5,061,123 A | | 10/1991 | Broussard | |
| 5,113,951 A | | 5/1992 | Houben et al. | |
| 5,129,467 A | * | 7/1992 | Watanabe et al. | 173/75 |
| 5,199,501 A | | 4/1993 | Kluber et al. | |
| 5,332,343 A | * | 7/1994 | Watanabe et al. | 409/136 |
| 5,467,835 A | | 11/1995 | Obermeier et al. | |
| 5,492,183 A | * | 2/1996 | Sollami | 173/216 |
| 5,688,082 A | | 11/1997 | Richardson | |
| 5,944,263 A | | 8/1999 | Lucco et al. | |
| 5,988,954 A | | 11/1999 | Gaskin et al. | |
| 6,079,078 A | | 6/2000 | Byington | |
| 6,146,066 A | * | 11/2000 | Yelton | 409/134 |
| 6,200,075 B1 | * | 3/2001 | Gaskin et al. | 408/67 |

* cited by examiner

Primary Examiner—Scott A. Smith
Assistant Examiner—Gloria R. Weeks
(74) Attorney, Agent, or Firm—Fay, Sharpe, Fagan, Minnich & McKee, LLP

(57) ABSTRACT

A dust suppression guard includes a shroud defining an enclosed space. The guard also includes a clamp mounted adjacent a first end of the shroud, a reinforcing member attached to a central portion of the shroud, and a boot attached adjacent a second end of the shroud. The dust suppression guard also includes a hose mounted to and extending through the shroud in communication with the enclosed space. A dust suppression system may include a vacuum source having an attached vacuum hose, where the vacuum hose connects to the hose mounted to and extending through the shroud.

24 Claims, 4 Drawing Sheets

DUST SUPPRESSION GUARD

BACKGROUND OF THE INVENTION

The present invention relates generally to dust suppression equipment. More particularly, the present invention relates to a guard for preventing dust from becoming airborne during concrete cutting procedures, especially the cutting of concrete in a building to install interior drainage tile, or other plumbing work, or any other circumstance where concrete needs to be cut within an enclosed environment.

Concrete dust liberated into the air during repair work of basements, concrete crawl spaces and concrete slabs has been a problem that plagues the construction industry. Typically, concrete must be cut or jack-hammered so that repairs could be made below the level of the concrete. When the concrete is cut either by a concrete saw or jack-hammer, the resulting dust creates cleanup issues for the building owner, as well as health issues for the crew that is performing the work.

Numerous attempts have been made throughout the years to minimize the dust that is created in such circumstances. One method has been to spray the concrete with water, so that dust will contact the water hopefully preventing it from becoming airborne, thereby eliminating the dust in the air. An example of this method is to attach a water spray unit to the jack-hammer and connect the water spray unit to a water hose, so that there is a continual supply of misted water being supplied near the hammer as the concrete is being cut. This method is only partially effective, as some dust still escapes and the water that has been laid down creates a mess when it is sprayed on adjacent objects by the operation of the jack-hammer or tool. It also leaves a slurry that needs to be cleaned up.

Another method has been to wet cardboard or other fibrous material, lay it on the area to be cut, and then jack-hammer through that material, again in an attempt to eliminate the amount of dust that can become airborne. This method is only partially effective. Once the hammer cuts through the cardboard, a substantial amount of dust escapes into the air through the holes in the cardboard.

Another method has been to place fans in the work area, or to place fans in doorways or windows to push the airborne dust out of the structure. This method has mixed results. If the fan is powerful enough, a good amount of the dust will be evacuated, although dust still infiltrates the work area. If it does work well, there is a hazard to the area outside the dwelling. The airborne dust can affect cars, the outside of the structure it is being vented from, or other nearby structures.

None of these attempts have been totally successful in eliminating the problem of airborne dust. Dust is still a major concern, both for owners of the building undergoing repair and for the workers doing the work. Also, safety officials, such as OSHA, are concerned about dust inhalation by workers.

Accordingly, it is desirable to develop a new and improved dust suppressing device and system for use with percussive tools, such as air-hammers or jack-hammers which would overcome the foregoing difficulties and others while providing better and more advantageous over all results.

SUMMARY OF THE INVENTION

A dust suppression guard for a percussion tool comprises a shroud defining an enclosed space. The shroud has a first end, a central portion and a second end. A clamp is joined to the shroud proximal the first end. The clamp is adapted to attach the shroud to an associated percussion tool. A reinforcing member is attached to the central portion of the shroud. A hose is mounted to and extends through the shroud in communication with the enclosed space. A boot is joined to the shroud proximal the second end of the shroud.

A dust suppression system for an associated apparatus in the category of an air hammer, concrete breaker and coring machine, or the like, where the associated apparatus has a working component, includes a vacuum source having an attached vacuum hose. The dust suppression system also comprises a flexible shroud defining an enclosed space and enclosing at least partially the working component of the associated apparatus. The shroud comprises a first end, a central portion and a second end. A connector is attached at the first end of the shroud. The connector is adapted to attach the shroud to the associated apparatus. A weighted member is attached at the second end of the shroud. The weighted member urges the shroud toward an associated work area. A hose has a first end extending through the shroud and communicating with the enclosed space. A second end of the hose is adapted to attach to the vacuum hose.

A dust suppression system for use with a percussion tool having a working component includes a vacuum source having an attached vacuum hose. The dust suppression system also includes a tubular member having a first end adapted to be attached to an associated percussion tool and a second end adapted to seat on an associated working surface, wherein the first end has a smaller diameter than the second end. The tubular member further comprises a smooth inner surface and an opening between the first end and the second end, the inner surface defining an enclosed space. The system also includes a clamp attached adjacent the first end of the tubular member. The clamp is adapted to attach the first end of the tubular member to the associated percussion tool. The dust suppression system also includes a boot attached adjacent the second end of the tubular member. The boot weighs enough to seat the second end of the tubular member on the associated working surface. The system also includes a hose extending through the opening having an end adapted to receive the vacuum hose.

A dust suppression system for an apparatus in the category of an air hammer, concrete breaker and coring machine, or the like, comprises a shroud oriented approximately vertically, the shroud having a first wall and a second wall joined to the first wall. The system also includes a connector trapped between the first wall and the second wall. The connector is adapted to connect the shroud to an associated apparatus. The dust suppression system also includes a weighted member, spaced from said connector, trapped between the first wall and the second wall. The weighted member urges the shroud downwardly. The system also includes a reinforcing member, disposed between the connector and the weighted member, trapped between the first wall and the second wall.

Benefits and advantages of the present invention will become apparent to those skilled in the art upon a reading and understanding of the following detailed specification.

BRIEF DESCRIPTION OF THE DRAWINGS

The invention will take form in certain parts and arrangements of parts, a preferred embodiment of which will be described in detail in this specification and illustrated in the accompanying drawings which form a part hereof and wherein.

DETAILED DESCRIPTION OF THE INVENTION

The present invention relates to a dust suppression guard for use with percussive tools. It should be recognized, however, that the dust suppression guard may also be used with other tools, for example tools in the category of an air-hammer, concrete breaker and coring machine, or the like. The present invention also relates to a dust suppression system for apparatus of the type mentioned above. More specifically, the dust suppression guard is used to limit the spread of dust stirred up while drilling or cutting a concrete surface or other similar hard surface. As well as being a dust suppression guard and a dust suppression system, the invention also provides a safety guard for flying debris. The invention can be used to inhibit chips of concrete from flying up and hitting an operator of the percussive tool to which the inventive guard is attached. The guard is attachable to a variety of percussive tools of different diameters and shapes.

Figure 1:
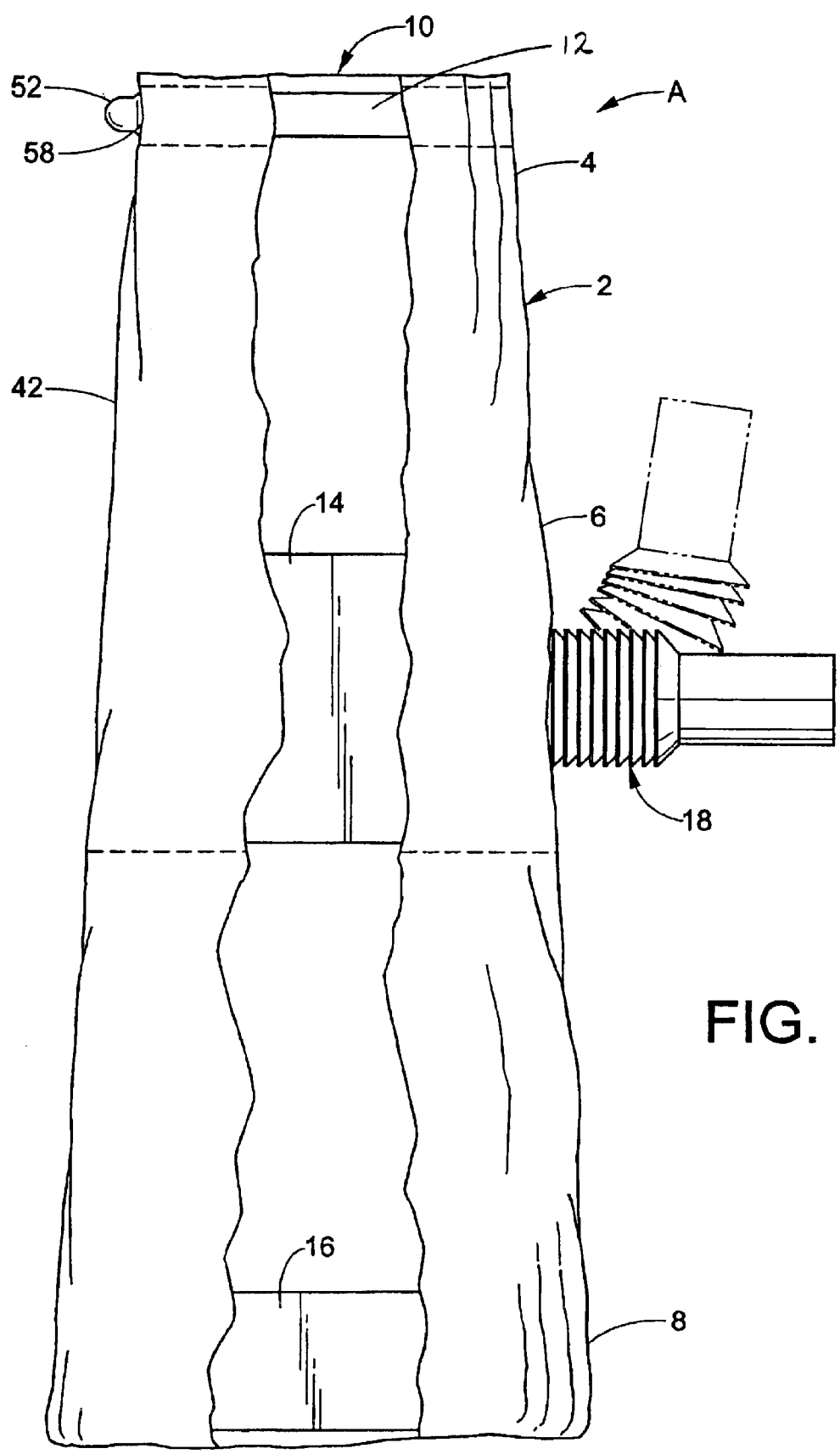
FIG. 1 is a side elevational view, partially cut away, of a dust suppression guard according to the present invention.

Referring now to the drawings, wherein the showings are for purposes of illustrating a preferred embodiment of the invention only and not for purposes of limiting same, FIG. 1 shows a dust suppression guard A. The dust suppression guard A includes a tubular member or shroud 2 having a first end 4, a central portion 6 and a second end 8. The diameter of the shroud at the first end 4 may be smaller than the diameter of the shroud at the second end 8. In other words, the shroud can be conical in shape. The shroud 2 defines an enclosed space 10 that will surround the working area where a tool is working on a surface. The dust suppression guard further includes a clamp 12 attached near the first end 4 of the shroud 2, a reinforcing member 14 attached in the central portion 6 of the shroud 2 and a weighted member or boot 16 attached near the second end 8 of the shroud.

Figure 2:
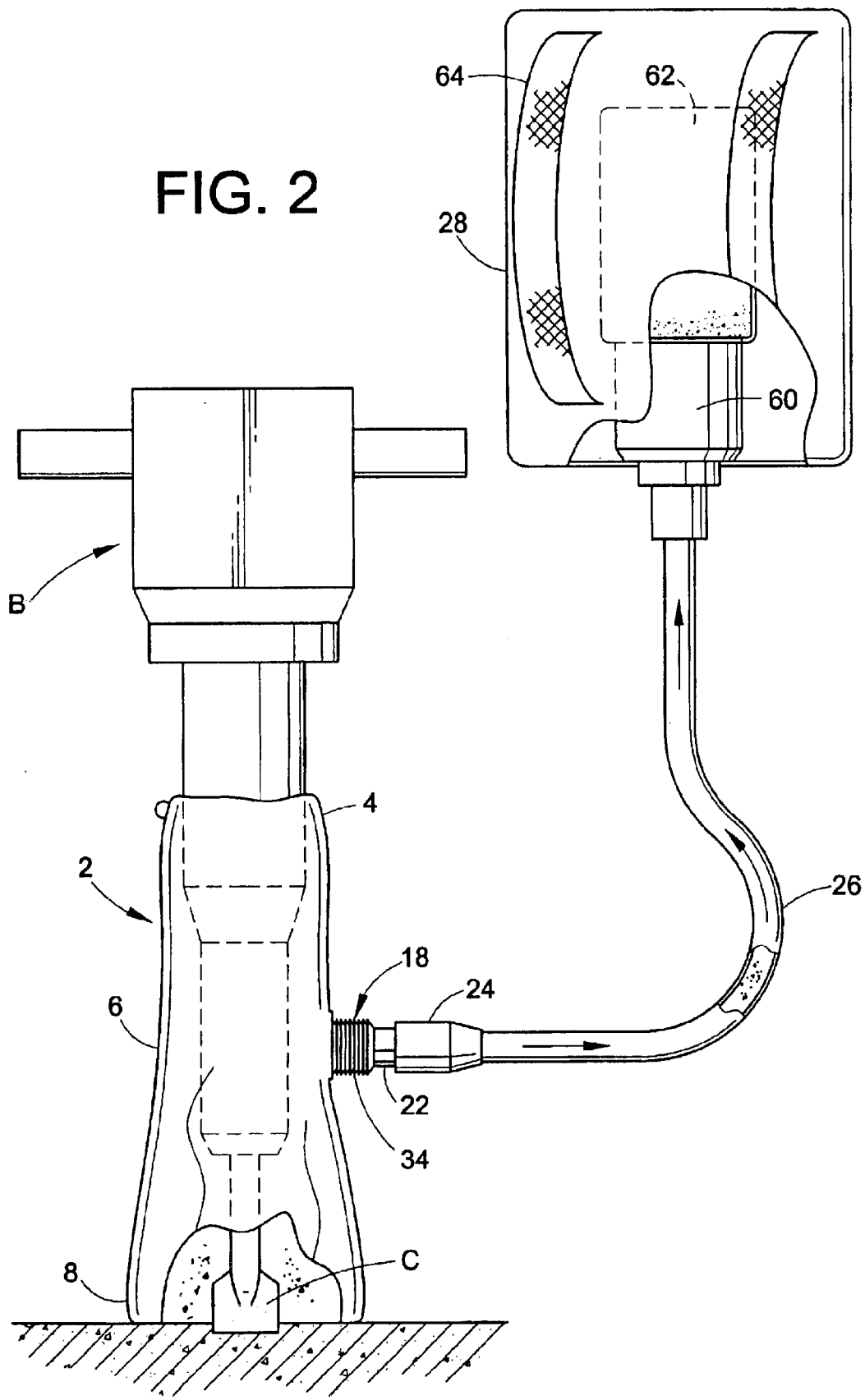
FIG. 2 is a schematic front elevational view of a dust suppression system in accordance with the present invention employing the dust suppression guard of FIG. 1.

Referring now to FIG. 2, the first end 4 of the shroud 2 can be selectively attached to a percussion tool B. While the percussion tool is illustrated to be a conventional jack hammer, such tools include any apparatus in the category of a conventional air-hammer, concrete breaker and coring machine, or the like. Second end 8 of the shroud 2 urges the shroud downwardly towards a working surface so that the shroud 2 encloses the working member or bit C of the percussion tool B during hammering.

Figure 3:
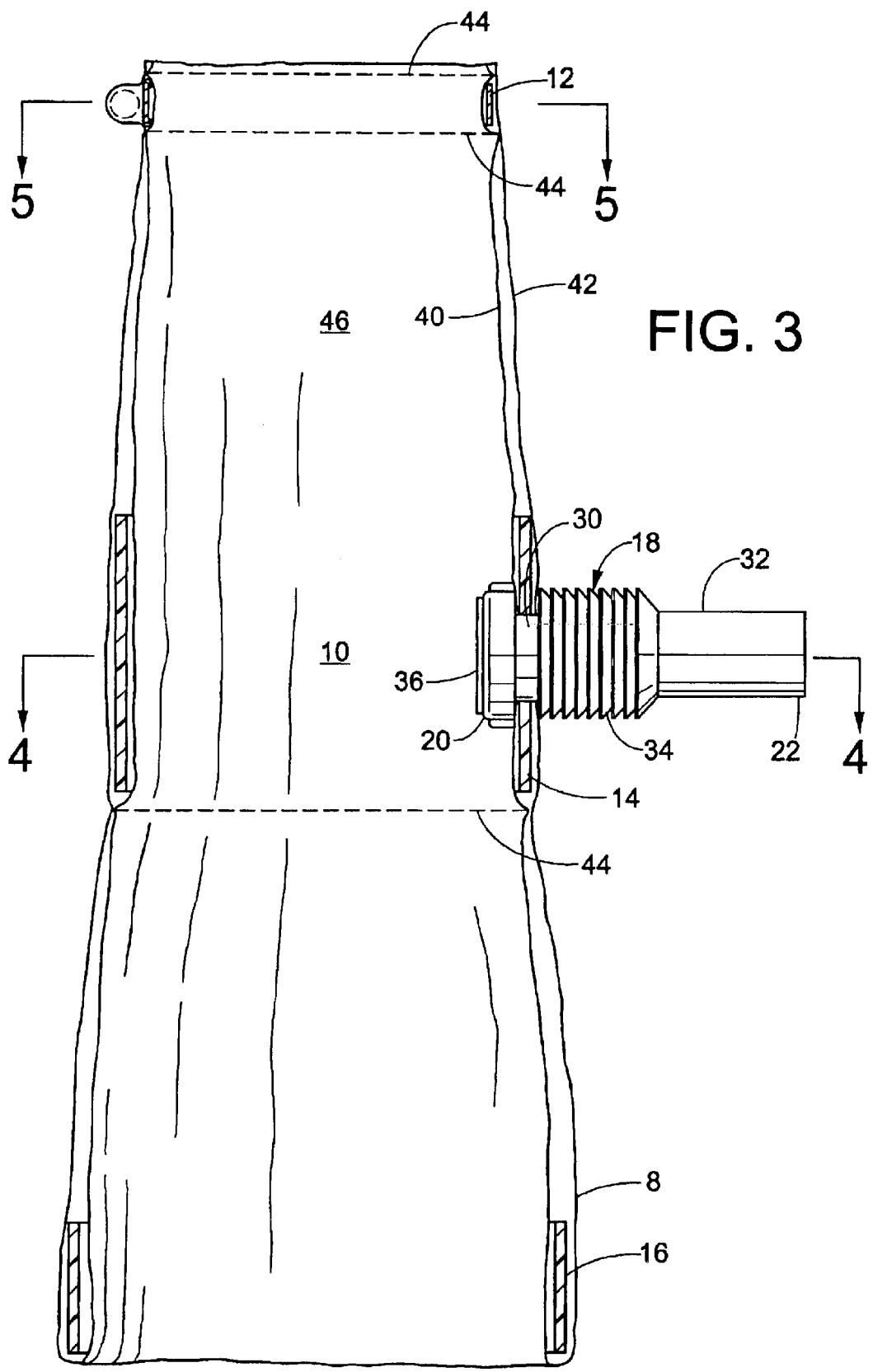
FIG. 3 is a longitudinal cross sectional view of the dust suppression guard of FIG. 1.

As seen in FIGS. 1, 2 and 3, the dust suppression guard may include a hose 18 mounted to and extending through the shroud. The dust suppression guard may include a hose when conditions are conducive to using a vacuum attached to the guard to remove dust. The guard might not have a hose, or at least the hose might not be attached to a vacuum cleaner, when conditions are not conducive to using a vacuum. For example with water standing on the work surface, water seeping up through the work surface as the concrete is broken, or if the concrete is wetted down with water prior to hammering, the operator may not want to use a vacuum cleaner, and thus the shroud may not have a hose. The operator may choose to use a conventional wet/dry type vacuum source in such wet conditions to remove the debris from around the work surface. A wet/dry, usually tank-type, vacuum cleaner could be used after a cutting of the concrete. Of course, the hose 18 could also be connected to a wet/dry vacuum cleaner during the concrete cutting process. Even without the source of vacuum connected to it, the shroud has two major functions. First, it prevents concrete dust liberated during the cutting process from coating the adjacent areas of the structure where the cutting takes place. Second, it prevents flying debris, such as chips or small chunks of concrete, from injuring the operator or harming the surroundings. In other words, without the shroud, the operator could be injured by flying debris resulting from the cutting process.

The hose 18 includes a first end 20 positioned inside the shroud to communicate with the enclosed space 10. The hose also has a second end 22 that can be selectively connected to an end 24 of a vacuum hose 26 that is connected to a vacuum source 28 The vacuum source 28 can be a conventional backpack-type vacuum cleaner having a motor 60, a dust cup 62 and straps 64 so that an operator can wear the vacuum on his back. The backpack-type vacuum cleaner may be mounted in a type of harness system that holds the vacuum securely in place to protect against back injury or fatigue. Alternately, the vacuum source can be of any desired conventional type, such as a tank-type wet/dry vacuum cleaner, a large industrial dust separator unit, or the like. The vacuum source could also be placed on the floor or ground near the work area. Placing the vacuum source on the ground may be preferred if one is working in a confined space.

Referring now to FIG. 3, the hose 18 mounted to the shroud 2 includes a first relatively rigid portion 30 protruding into the enclosed space 10 and a second relatively rigid portion 32 adapted to mate with the vacuum hose 26. The hose 18 allows communication between the vacuum source 28 and the enclosed space 10, via the vacuum hose 26. The hose 18 further includes a bendable portion 34 connecting the first and second relatively rigid portions 30 and 32 so that adjustments can be made in the relationship of the hose ends 20 and 22. As seen in FIG. 1, the hose second end 22 can be bent up, down or to the side in relation to the hose first end 20.

Figure 4:
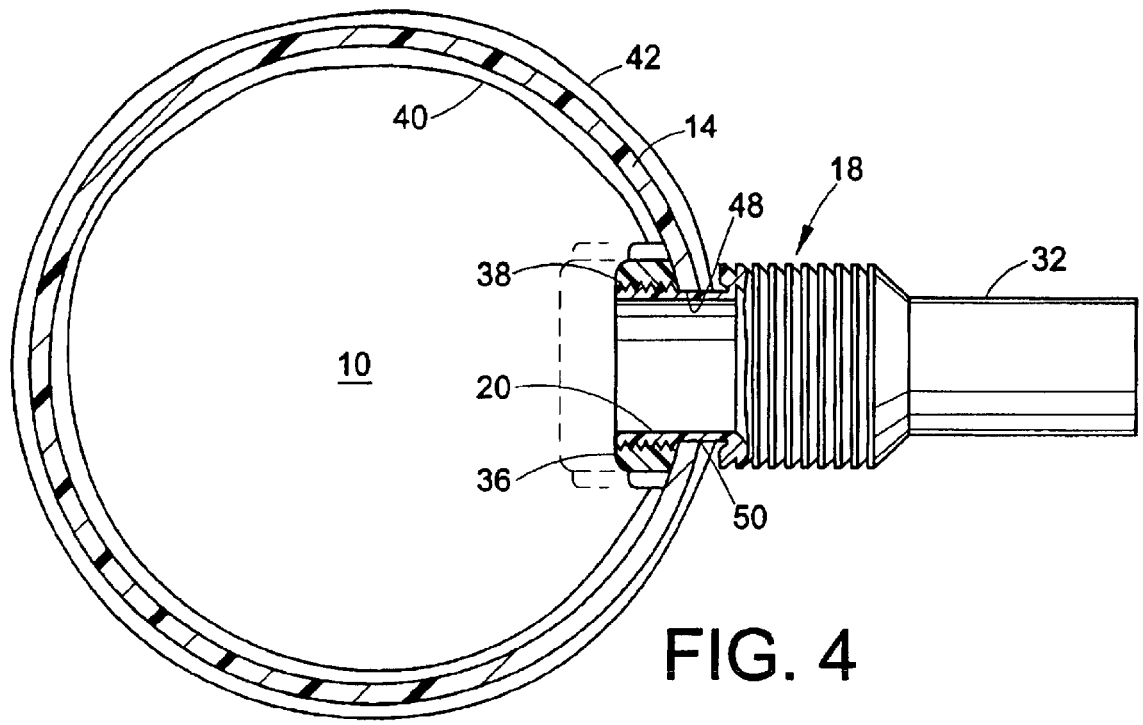
FIG. 4 is a top plan view in cross-section of the dust suppression guard of FIG. 1 taken at line 4—4 of FIG. 3.

Referring to FIG. 4, a fastener 36 can be attached to the first end 20 via interconnecting threading 38. The fastener 36 is located inside the enclosed space 10 to more securely fasten the hose 18 to the shroud 2. It should, of course, be appreciated that other suitable conventional means can be employed to fasten the hose 18 to the shroud 2, either permanently or in a way that they can be selectively separated.

FIG. 3 further illustrates that the shroud 2 can comprise an inner wall 40 and an outer wall 42, both walls being flexible. In the embodiment illustrated, the inner and outer walls 40 and 42 are made of one piece of material where the material is looped around the boot 16. The walls 40, 42 can be made of vinyl or another conventional material that is durable enough to withstand a dusty and dirty environment. The two layers of material enclose the reinforcing member 14 and the clamp 12. The two layers of material can be stitched together above and below the clamp 12 and above and below the reinforcing member 14, via stitching 44 in order to fix the clamp and the reinforcing member vertically in position. The shroud may have a smooth inner surface 46 that defines the enclosed space 10. As mentioned, the clamp 12, the reinforcing member 14, and the boot 16 can be sandwiched in between the inner wall 40 and the outer wall 42. Such stitching limits the vertical movement of the clamp 12 and reinforcing member 14 in the vertical direction. On the other hand, the boot 16 can travel upwardly between the walls 40 and 42, conceivably to adjacent the reinforcing member 14 but will be drawn downwardly by gravity.

The shroud 2 need not be constructed of only one piece of material looped around one end of the shroud to create two adjacent walls. The shroud could include only a single wall of material with the clamp 12, reinforcing member 14, and the clamp 16 being mounted to the wall of material at different vertical locations on the shroud, i.e. positioned inside the enclosed space or on an outer surface of the shroud. What is important is that the material of the shroud is flexible to accommodate the tool to which the shroud is attached and to allow the shroud to move vertically so that the shroud lower end can adjust to contact the work surface.

Referring again to FIG. 4, the reinforcing member 14 may be annular in shape. The annular reinforcing member 14 may also have a hole 48 that receives the first end 20 of the hose 18. Likewise, the shroud 2 may have an opening 50 aligned with hole 48 so that the first end 20 can protrude into the enclosed space 10. The reinforcing member 14 can be molded rubber or any other suitable material that is durable, flexible and firm. The reinforcing member 14 is useful since it retains the shroud 2 in its substantially cylindrical shape.

The boot 16 located at the second end 8 of the shroud may also have an annular shape, however the shape of the boot is not critical. Due to its weight, the boot 16 urges the shroud 2 toward an associated work area. Accordingly, any member heavy enough to retain the shroud around the work surface during hammering would suffice as the boot 16, so long as portions of the second end 8 of the shroud do not lift up during hammering and the boot allows the vacuum to work. For example, the boot 16 could comprise an annular weight, multiple weights fastened together by a wire or other means to form a loop, or the like, so as long as the working area is surrounded by the second end 8 of the shroud and air flow out of the shroud is prevented. The boot in the preferred embodiment, can be made of a molded rubber. Again, the boot 16 much like the reinforcing 14 can be made of materials that are durable, somewhat flexible yet firm.

Figure 5:
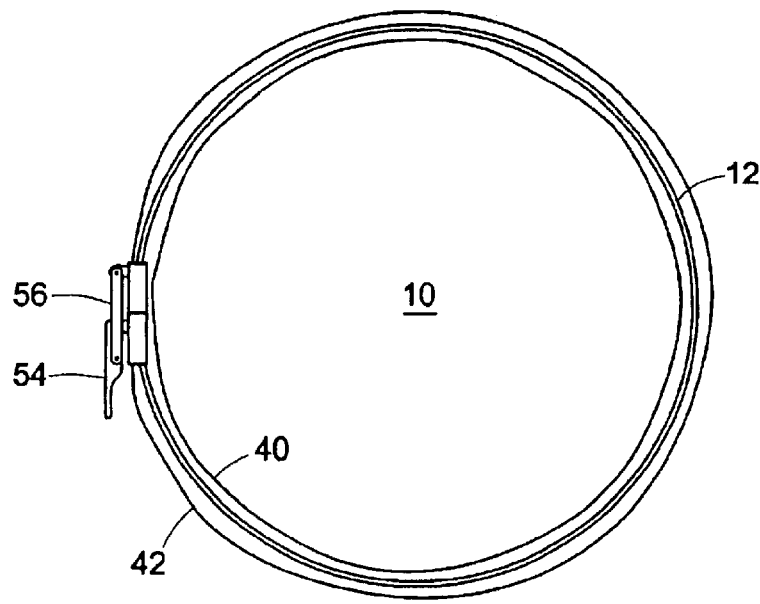
FIG. 5 is a top plan view in cross-section of the dust suppression guard of FIG. 1 taken at line 5—5 of FIG. 3.

As illustrated in FIG. 5, clamp 12 may be an over-center clamp. Clamp 12 may also be a hose clamp or another conventional clamp, which is not shown in the figures. Clamp 12 is used to fasten the first end of the shroud 2 to the percussion tool B. Other conventional types of connectors such as an elastic band or other fasteners capable of attaching the shroud to the percussion tool will also suffice.

The clamp 12 can include a tightening apparatus 52 having a lever arm 54 and a pair of links 56 (only one visible in FIG. 5). Referring back to FIG. 1, the outer wall 42 of the shroud 2 may have an opening 58 through which tightening apparatus 52 is accessible.

As noted, the dust suppression guard according to the present invention can include a shroud having a clamp mounted adjacent to its first end, a reinforcing member attached to its central portion, and a boot attached adjacent its second, lower end. The dust suppression guard can also include a hose mounted to and extending through the shroud in communication with an enclosed space defined by the shroud. The dust suppression system can include a vacuum source having an attached vacuum hose, where the vacuum hose connects to the hose mounted to and extending through the shroud.

If desired, the shroud can include an inner wall and an outer wall so that the clamp, the reinforcing member, and the boot are trapped in between the inner and outer wall. The clamp mounted adjacent the top end of the shroud allows the shroud to be attached to the percussion tool or jack-hammer. The reinforcing member attached to the central portion of the shroud may have a hole that receives the hose so that the hose extends through the shroud and the reinforcing member. Of course, if no hose is present, there may be no need for the center reinforcing member. In other words, the shroud could simply have a clamp at one end and a boot at the other end. The boot weighs enough to urge the shroud toward the surface of the area being worked by the hammer.

Furthermore, the vacuum source of the dust suppression system may be a backpack-type vacuum cleaner that can be worn by the operator. The vacuum hose can be connected to a portion of hose that extends through the shroud. The hose mounted on the shroud may include a rigid portion protruding through the shroud, a rigid portion connecting with the vacuum hose and a bendable portion connecting the two rigid portions to allow adjustments in the hose.

If desired, the shroud may hang below the bit of the percussive tool when the bit is spaced from the work surface, such as a basement floor, slab or other piece of concrete. The shroud hangs below the bit to allow a little vertical movement in the shroud during operation of the percussive tool so the bottom portion of the shroud does not have to leave the work area surface. The diameter of the upper end of the shroud may have a smaller diameter than the lower end of the shroud.

The invention has been described with reference to a preferred embodiment. Obviously, alterations and modifications will occur to others upon reading and understanding of this specification. It is intended to include all such modifications and alterations insofar as they come within the scope of the appended claims or the equivalents thereof.

What is claimed is:

1. A dust suppression guard for a percussion tool, said guard comprising:

a shroud defining an enclosed space, said shroud having a first end, a central portion a second end, wherein said shroud comprises an inner wall and an outer wall, wherein said inner and outer walls are secured to each other;

a clamp joined to said shroud proximal said first end, said clamp adapted to attach said shroud to an associated percussion tool;

a reinforcing member attached to said central portion of said shroud;

a hose mounted to and extending through said shroud and in communication with said enclosed space;

a boot joined to said shroud proximal said second end; and wherein said reinforcing member and said boot are interposed between said inner wall and said outer wall.

2. The dust suppression guard of claim 1 wherein said shroud comprises a flexible wail.

3. The dust suppression guard of claim 1 wherein said hose extends through said reinforcing member.

4. The dust suppression guard of claim 1 wherein said hose comprises a first relatively rigid portion adapted to mate with an associated vacuum hose, a second relatively rigid portion protruding into said enclosed space and a bendable portion connecting said first and second relatively rigid portions.

5. The dust suppression guard of claim 1 wherein said boot comprises a weighted ring-shaped member for urging said second end of said shroud toward an associated work surface.

6. A dust suppression guard for a percussion tool, said guard comprising:
   a shroud defining an enclosed space, said shroud having a first end, a central portion, and a second end;
   a clamp joined to said shroud proximal said first end, said clamp adapted to attach said shroud to an associated percussion tool;
   a reinforcing member attached to said central portion of said shroud;
   a hose mounted to and extending through said shroud and in communication with said enclosed space;
   a boot joined to said shroud proximal said second end; and
   a fastener attached to said hose in said enclosed space.

7. A dust suppression system for an associated apparatus in the category of an air hammer, concrete breaker and coring machine, or the like, the associated apparatus having a working component, said system comprising:
   a backpack-type vacuum cleaner having an attached vacuum hose;
   a flexible shroud defining an enclosed space and enclosing, at least partially, the working component of the associated apparatus, said shroud comprising a first end, a central portion and a second end;
   a connector attached adjacent said first end of said shroud, said connector adapted to attach said shroud to the associated apparatus;
   a weighted member attached adjacent said second end of said shroud, said weighted member urging said shroud toward an associated work area; and
   a hose having a first end extending through said shroud and communicating with said enclosed space and a second end adapted to attach to said vacuum hose.

8. A dust suppression system for an associated apparatus in the category of an air hammer, concrete breaker and coring machine, or the like, the associated apparatus having a working component, said system comprising:
   a vacuum source having an attached vacuum hose;
   a flexible shroud defining an enclosed space and enclosing, at least partially, the working component of the associated apparatus, said shroud comprising a first end, a central portion and a second end;
   a connector attached adjacent said first end of said shroud, said connector adapted to attach said shroud to the associated apparatus;
   a weighted member attached adjacent said second end of said shroud, said weighted member urging said shroud toward an associated work area;
   a hose having a first end extending through said shroud and communicating with said enclosed space and a second end adapted to attach to said vacuum hose; and
   wherein said second end of said shroud hangs below the working component of the associated apparatus when said working component is spaced from the associated work surface.

9. The dust suppression system of claim 7 wherein said first end of said shroud has a smaller diameter than said second end of said shroud.

10. A dust suppression system for use with a percussion tool having a working component, said system comprising:
    a vacuum source having an attached vacuum hose;
    a tubular member having a first end adapted to be attached to an associated percussion tool and a second end adapted to seat on an associated working surface, wherein said first end has a smaller diameter than said second end, said tubular member further comprising an opening between said first end and said second end and being flexible throughout its length, said inner surface defining an enclosed space;
    a clamp attached adjacent said first end of said tubular member, said clamp adapted to attach said first end of said tubular member to the associated percussion tool;
    a boot attached adjacent said second end of said tubular member, said boot weighing enough to seat said second end of said tubular member on the associated working surface; and
    a hose extending through said opening having an end adapted to receive said vacuum hose.

11. The dust suppression system of claim 10 further comprising a reinforcing member disposed on said tubular member between said clamp and said boot.

12. The dust suppression system of claim 11 wherein said hose extends through said reinforcing member.

13. The dust suppression system of claim 10 wherein said boot is approximately annular in shape.

14. A dust suppression guard for an apparatus in the category of an air hammer, concrete breaker and coring machine, or the like, said guard comprising:
    a shroud oriented approximately vertically, said shroud having a first wall and a second wall joined to said first wall;
    a connector trapped between said first wall and said second wall, said connector adapted to connect said shroud to an associated apparatus; and
    a weighted member, spaced from said connector, trapped between said first wall and said second wall, said weighted member urging said shroud downwardly.

15. The dust suppression guard of claim 14 further comprising:
    a reinforcing member, disposed between said connector and said weighted member, and trapped between said first wall and said second wall; and
    a tube mounted to and extending through said reinforcing member.

16. The dust suppression guard of claim 15 wherein said tube includes a bendable section.

17. The dust suppression guard of claim 15 wherein said first and second walls are joined together on opposite sides of said connector to limit vertical movement of said connector.

18. The dust suppression guard of claim 14 wherein said connector comprises a hose clamp.

19. The dust suppression guard of claim 14 wherein said shroud comprises a vinyl material.

20. The dust suppression guard of claim 14 wherein said first wall and said second wall are joined by stitching.

21. The dust suppression guard of claim 14 wherein said first and second walls are joined together on opposite sides of said reinforcing member to limit vertical movement of said reinforcing member.

22. The dust suppression guard of claim 14 wherein the shroud comprises one piece of material folded over and mechanically joined in at least one seam.

23. A dust suppression guard for a percussion tool, said guard comprising:
    a shroud defining an enclosed space, said shroud having a first end, a central portion and a second end, wherein said shroud comprises a material that is flexible throughout its length;
    a clamp joined to said shroud proximal said first end, said clamp adapted to attach said shroud to an associated percussion tool;

a reinforcing member attached to said central portion of said shroud;

a hose mounted to and extending through said flexible material of said shroud and in communication with said enclosed space; and a boot joined to said shroud proximal said second end.

24. A dust suppression guard for a percussion tool, said guard comprising:

a shroud defining an enclosed space, said shroud having a first end, a central portion a second end, wherein said shroud comprises an inner wall and an outer wall, wherein said inner and outer wails are secured to each other;

a clamp joined to said shroud proximal said first end, said clamp adapted to attach said shroud to an associated percussion tool;

a reinforcing member attached to said central portion of said shroud;

a hose mounted to and extending through said shroud and in communication with said enclosed space;

a boot joined to said shroud proximal said second end; and wherein said clamp is interposed between said inner wall and said outer wall, wherein said outer wail defines an opening and said clamp includes a tightening apparatus accessible through said opening in said outer wall.

* * * * *